United States Patent Office 3,499,961
Patented Mar. 10, 1970

3,499,961
DIMETHYL SULFOXIDE-ENHANCED ASTRINGENT ALUMINUM, ZINC OR ZIRCONIUM ANTIPERSPIRANT SALT COSMETICS
Richard L. Dobson, Portland, and Stanley W. Jacob, Oswego, Oreg., and Robert J. Herschler, Camas, Wash., assignors, by direct and mesne assignments, to Crown Zellerbach Corporation, San Francisco, Calif., a corporation of Nevada
No Drawing. Filed Dec. 9, 1963, Ser. No. 329,265
Int. Cl. A61k 7/00
U.S. Cl. 424—68                        17 Claims This invention relates to new compositions and methods for reducing perspiration, and particularly relates to increasing the activity of conventional antiperspirants.

The art is familiar with many antiperspirant compositions containing metallic salts with astringent action. Among such salts are the well known salts, aluminum chloride and aluminum chlorohydrate. Such compositions are usually applied for reducing sweating in the axillary region. It is desirable to employ these known aluminum salts and other metallic salts because they have been established to have some degree of effectiveness and have acceptable toxicity levels, especially with respect to epidermal irritation. It is recognized as desirable to increase the antiperspirant effect of these known salts without causing any objectionable toxicity. It is also recognized as desirable to provide an antiperspirant ingredient which at the same time more effectively reduces perspiration with a lower incidence of epidermal irritation.

It is accordingly a primary object of this invention to provide a method and composition whereby conventional metallic antiperspirants more effectively reduce perspiration.

It is another object of this invention to provide compositions and a method whereby a particular antiperspirant ingredient more effectively reduces perspiration while exhibiting low levels of skin toxicity than other known agents.

Another object of this invention are compositions and a method in which various metallic salt astringents will exert greater antiperspirant properties in various cosmetic bases and carriers.

These and other objects which will become apparent are attained by the invention which will be disclosed in the ensuing specification.

It has been found that known metallic salt astringents have their antiperspirant properties enhanced or potentiated when such astringents and a dialkyl sulfoxide contact a cutaneous area containing sweat glands. While dialkyl sulfoxides such as methyl ethyl sulfoxide, ethylpropyl sulfoxide, dibutyl sulfoxide and the like potentiate or increase the antiperspirant properties of known metallic salt astringents, dimethyl sulfoxide in particular is the preferred compound.

The substance, dimethyl sulfoxide, is supplied by Crown Zellerbach Corporation of California, and is a water clear, water miscible hydroscopic, neutral, organic liquid melting at about 18 degrees C. and boiling at about 189 degrees C. Dimethyl sulfoxide is characterized by very low toxicity and may be prepared by various methods such as described in U.S. Patent 2,581,050, U.S. 2,935,533, and U.S. 2,702,824.

The dimethyl sulfoxide may be incorporated at various concentrations of the antiperspirant compositions, but it is generally preferred to be present up to about 50% based on the weight of the other ingredients in the composition. Concentrations above this amount have been successfully used to enhance or potentiate the antiperspirant activity of metallic salt astringents, but this upper range is not preferred because, on occasion, some slight irritation and discomfort may occur when applied to the axillary region.

The antiperspirant compositions which may be used include those with conventional cosmetic bases containing the metallic astringent salts. Among such salts may be included zirconium lactate, zinc phenol sulfonate, aluminum chloride hydrate, aluminum hydroxide dichloride hydrate, aluminum phosphate, aluminum phenol sulfonate, aluminum sulfonate, and the like metallic salts with astringent action. The cosmetic bases may include the usual cream, the lotion form, the emulsion form, the propellant form, and the powder form where a complex of aluminum salts with dimethyl sulfoxide is used.

It has been additionally found that complexes formed by dimethyl sulfoxide and astringent metallic salts, particularly aluminum chloride, have exceptional enhanced antiperspirant properties with a low order of cutaneous toxicity. In the case of aluminum chloride, complexes may be formed with two or more moles of dimethyl sulfoxide and one mole of aluminum chloride, but it is preferred to use the complex formed with six moles of dimethyl sulfoxide and one mole of aluminum salt. All such compounds may be referred to herein as "complex" or, in the case of aluminum chloride, "aluminum complex." The aluminum complex called aluminum chloride hexadimethyl sulfoxide complex is prepared by adding six moles of dimethyl sulfoxide to one mole of anhydrous aluminum chloride in a solvent such as diethyl ether. For a further description of preparation of the aluminum complex, refer to the article Metallic Complexes of Dimethyl Sulfoxide by Messrs. Selbin, Bull and Holmes, Jr., pp. 219–224, volume 16, 1961, The Journal of Inorganic and Nuclear Chemistry, particularly at page 222. The aluminum complex is non-hygroscopic, is a white powder, and is stable in the air. The aluminum complex is fairly soluble in water and readily dispersed in a number of bland cosmetic bases. The aluminum complex has a much lower skin irritant action that either aluminum chloride or aluminum hydroxide dichloride. Use of the aluminum complex, therefore, permits the use of higher concentrations in an antiperspirant composition.

The antiperspirant composition containing dimethyl sulfoxide and the metallic salt with astringent action, or the complex, may contain other ingredients to increase the effectiveness of the composition. They may be antibacterial agents, e.g., hexachlorophene, and ingredients to make the composition more cosmetically elegant, e.g., perfumes, dyes, and the like.

The various aluminum salts may be directly dissolved in water or other solvents such as ethanol.

The following examples are presented to illustrate various embodiments of the invention, but it should be understood that such examples are not intended as an exclusive teaching.

EXAMPLE 1

Reduction of perspiration on forearm

A 2% concentration of aluminum chloride was placed in three different solutions: Two test solutions of aqueous dimethyl sulfoxide at 75% and at 50% and a control solution of water. Each solution was applied to a separate site of the forearm. After ten minutes the areas were dried, and after another twenty minute period, Mecholyl was injected into each site at a dose of 0.05 milliliter (4 mg. per ml.). Mecholyl is an agent known to induce profuse sweating. At the site where 75% aqueous dimethyl sulfoxide solution was applied, two or three drops of sweat were noted. The site containing 50% dimethyl sulfoxide had a greater number of drops of sweat, but the control site was characterized by profuse sweating over the entire area where the 2% aluminum chloride in water had been applied.

EXAMPLE 2

Reduction of perspiration with varied amounts of dimethyl sulfoxide

Five solutions were prepared. Each contained 2% of aluminum chloride. One solution contained water, and the other solutions contained, respectively, 10%, 25%, 50% and 75% aqueous dimethyl sulfoxide. These five preparations plus ordinary water were applied to six different sites on the forearm and allowed to remain there for ten minutes. The sites were then dried and painted with a 2% iodine and ethanol solution. After twenty-four hours, each site was injected with Mecholyl at a dosage of 0.05 milliliter (4 mg. per ml.). Ten minutes after the Mecholyl injections, the subject's back was covered with a starched towel. Reduction of sweating was determined by the amount of starch discoloration by the iodine on the towel. The amount of sweating generally decreased with the increasing concentrations of dimethyl sulfoxide in the preparations, except that the greatest inhibition of sweat occurred with the preparation containing 50% dimethyl sulfoxide.

EXAMPLE 3

Reduction of perspiration in the cutaneous region of the back

Solutions of 2% aluminum chloride were prepared in five different samples, one sample containing water, and the other four containing, respectively, 10%, 25%, 50% and 75% aqueous dimethyl sulfoxide. Each preparation was applied to areas of uniform size on a human subject's back. The solutions were applied with cotton tipped applicators continuously so that drying would not occur. Twenty minutes after completing the application, Mecholyl was applied in a dose of 0.05 milliliter (4 mg. per ml.) by injection. Ten minutes after injection, filter papers from weighed plastic bottles were applied for thirty minutes and covered with waxed paper squares to prevent evaporation. The weighing bottles and filter papers were again weighed. This procedure was repeated with the same subject in a single day, and the average results were:

| Concentration: | Mg. of sweat |
| --- | --- |
| 2% aluminum chloride 0% DMSO | 65.2 |
| 2% aluminum chloride 10% DMSO | 33.5 |
| 2% aluminum chloride 25% DMSO | 18.8 |
| 2% aluminum chloride 50% DMSO | 18.2 |
| 2% aluminum chloride 75% DMSO | 12.2 |
| Control | 58.8 |

EXAMPLE 4

Complex of aluminum salt and dimethyl sulfoxide

A 2% aluminum chloride solution in ethanol was compared with a 2% aluminum chloride hexadimethyl sulfoxide complex also in ethanol. Each solution was applied to a human subject's back with cotton tipped applicators continuously so that drying was prevented. Twenty minutes after completing application, Mecholyl was injected into each site at a dose of 0.05 milliliter (4 mg. per ml.). Ten minutes after injection, filter papers contained in weighed plastic bottles were applied for thirty minutes and covered with polyethylene squares to prevent evaporation. The weighing bottles with filter papers containing the absorbed sweat were again weighed. The procedure was repeated using the same subject on a single day. The average weight of sweat using aluminum chloride hexahydrate in ethanol was 48.9 milligrams. The average weight of sweat measured for use of the 2% complex was 17.7 milligrams.

EXAMPLE 5

Antiperspirant compositions

Antiperspirant deodorant compositions were prepared by combining 33% aluminum chloride hexadimethyl sulfoxide complex by weight, 5% hexachlorophene by weight, and 62% of a vehicle by weight. Among useful vehicles or cosmetic bases are:

(1) Ethyl alcohol
(2) Isopropyl alcohol
(3) Water plus Methocel 400 adjusted to a viscosity of 300 centiposes
(4) Carbowax 200
(5) Carbowax 400
(6) Carbowax 1500
(7) Carbowax 4000
(8) Water The Carbowax 1500 was diluted with water to obtain a lotion of a desired consistency and the Carbowax 4000 was diluted with water to obtain a paste consistency for a cream.

EXAMPLE 6

Compositions with aluminum complex

Powdered antiperspirant compositions were prepared containing the aluminum chloride hexadimethyl sulfoxide complex. The compositions included ultra fine talc which was ball milled with dry complex. The three compositions contained, respectively, 10%, 20% and 30% by weight of the complex.

Each of the compositions was applied to the underarm of different subjects and the perspiration produced was measured as a weight collected on absorbent pads applied to the underarm area after exposing the subjects to a thermal stimulus for one-half hour at 95 degrees F. with 80% relative humidity. The same procedure was followed with three powder compositions containing like concentrations of aluminum chloride hexahydrate being applied to the subjects. The results showed that the amount of perspiration collected after treatment with the aluminum chloride hexadimethyl complex was ⅓ to ½ that collected from the subjects using compositions containing aluminum chloride hexahydrate.

EXAMPLE 7

Compositions with aluminium complex and with dimethyl sulfoxide

Two antiperspirant cream compositions were made. One composition included 24 parts by weight of aluminum chloride hexahydrate, 20 parts by weight of Carbowax 4000, and 10 parts by weight of distilled water. The other composition contained like amounts of ingredients, except that aluminum chloride hexadimethyl sulfoxide complex was used in place of aluminum chloride hexahydrate. Both compositions contained 5 grams of the antibacterial agent, hexamethylenetetramine, to provide deodorant properties. Paired comparisons of the compositions were made on three human subjects. The aluminum chloride hexahydrate composition was applied to the left underarm area, and the complex composition was applied to the right underarm area. Applications were carefully controlled to 1 gram of paste. Ten minutes after treatment, the subjects applied weighed absorbent pads to the underarm area and were subjected to thermal stimulus for thirty minutes using a room held at 95 degrees F. and 80% relative humidity. The average perspiration collected on the pad applied to the complex composition was about ½ that collected on the pad applied to the aluminum chloride hexahydrate composition treated area.

EXAMPLE 8

Composition with antioxidant

Two cream preparations were made. One included 24 parts by weight of aluminum chloride hexadimethyl sulfoxide, 20 parts by weight of Carbowax 4000, and 10 parts by weight of distilled water. The second composition was prepared containing the same ingredients in the same proportions except that two parts of ascorbic acid were added. Both compositions were studied in paired comparisons by ten human subjects. All ten subjects preferred the preparation containing the antioxidant ascorbic acid because it provided an esthetically better deodorant effect. Other cosmetically acceptable antioxidants are useful. Among them may be included vitamins such as ascorbic acid, hydroquinone, p-amino phenols, β,β dithiopropionic acid, sugar amines, lecithin, phenol oils such as eugenol, thiourea, sequestering agents to take up metals which would catalyze oxidation such as ethylenediaminetetracetic acid, and the like.

The foregoing examples illustrate that known metallic salts having recognized astringent properties may have their antiperspirant properties enhanced or potentiated when they are combined with dimethyl sulfoxide solutions at different concentrations. The examples also illustrate how the complex, aluminum chloride hexadimethyl slufoxide, is a particularly desirable and preferred antiperspirant agent with a very low degree of skin irritation. Generally, in such compositions the metallic salt may be present anywhere from 2% to 20% by weight, and the dimethyl sulfoxide may be present anywhere up to about 50% by weight in compositions which are liquid lotions or creams. When the complex is used, it may be used in a liquid lotion, cream or it may be incorporated in a powder talc anywhere from about 10% to 50% by weight. It is a desirable feature that a complex may be used at higher concentrations with a lessened chance for skin irritation while at the same time attaining increased antiperspirant properties.

A copending application has described how dimethyl sulfoxide may be combined with a variety of physiologically active substances to increase membrane penetraiton by such substances. It is not known if dimethyl sulfoxide operates thusly in the present invention. In any event, whatever the mechanism, antiperspirant compositions and methods have been provided in which there is a potentiated, enhanced or facilitated antiperspirant activity. It is likewise intended that various biocide or biostat deodorants may be included in the composition which penetrate membranes in the manner disclosed in the copending application. This further increases the usefulness and desirability of the antiperspirant compositions.

Whereas some embodiments of the invention have been illustrated and described, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

We claim:

1. A method for reducing the perspiration in cutaneous areas which includes the steps of contacting the cutaneous area with an effective amount of aluminum chloride hexadimethyl sulfoxide complex in a cosmetically acceptable carrier.

2. A method of reducing perspiration in cutaneous areas which includes the steps of contacting the cutaneous area with about 10% to about 50% by weight of aluminum chloride hexadimethyl sulfoxide and an antioxidant in a cosmetically acceptable carrier.

3. An antiperspirant composition comprising an effective amount up to about 50% by weight of a complex of aluminum chloride, and dimethyl sulfoxide and an effective amount of an antibacterial agent active against odor-causing microorganisms on the skin.

4. An antiperspirant composition comprising an effective amount up to about 50% by weight of a complex of aluminum chloride and dimethyl sulfoxide and an effective amount of a cosmetically acceptable antioxidant.

5. A method for reducing perspiration in cutaneous areas which includes topically contacting the area with a composition including an antiperspirant metallic salt with astringent properties, wherein the antiperspirant metallic salt is selected from the group consisting of zirconium antiperspirant salts, zinc antiperspirant salts or aluminum antiperspirant salts, in an effective amount, and an amount effective to enhance the antiperspirant properties of said metallic salt up to about 50% by weight of dimethyl sulfoxide, and a cosmetically acceptable carrier.

6. An antiperspirant composition comprising an effective amount of a metallic salt antiperspirant having astringent action, wherein the antiperspirant metallic salt is selected from the group consisting of zirconium antiperspirant salts, zinc antiperspirant salts and aluminum antispirant salts, an amount effective to enhance the antiperspirant properties of said metallic salt up to about 50% by weight of dimethyl sulfoxide, and a cosmetically acceptable carrier.

7. The antiperspirant composition of claim 6 wherein there is additionally included an effective amount of an antibacterial agent active against odor-causing microorganisms on the skin.

8. The antiperspirant composition of claim 6 wherein there is additionally included an effective amount of a cosmetically acceptable antioxidant.

9. The composition of claim 6 wherein the cosmetic carrier is a lotion.

10. The composition of claim 6 wherein the cosmetic carrier is a cream.

11. The composition of claim 6 wherein the cosmetic carrier is an ethyl alcohol and water mixture.

12. An antiperspirant composition comprising between about 2% and about 20% by weight of a metallic salt antiperspirant having astringent action, wherein the metallic portion of the antiperspirant salt is selected from the group consisting of zirconium, zinc or aluminum, an amount effective to enhance the antiperspirant properties of said metallic salt up to about 50% by weight of dimethyl sulfoxide, and a cosmetic carrier to make up the balance of the composition.

13. The composition of claim 12 which further includes an effective amount of a cosmetically acceptable antioxidant.

14. The composition of claim 12 which further includes an effective amount of an antibacterial agent active against odor-causing microorganisms on the skin.

15. The composition of claim 14 wherein the antibacterial agents is hexachlorophene.

16. A method for reducing perspiration in cutaneous areas which comprises topically contacting the area with a composition including an effective amount up to about 20% by weight of aluminum chloride, an amount effective to enhance the antiperspirant properties of said aluminum chloride up to about 50% by weight of dimethyl sulfoxide and a cosmetically acceptable carrier.

17. A method for reducing perspiration in cutaneous area which comprises topically contacting the area with a composition comprising an effective amount up to about 20% by weight of a metallic salt selected from the group consisting of zirconium lactate, zinc phenol sulfonate, aluminum chloride hydrate, aluminum hydroxide, dichloride hydrate, aluminum phosphate, aluminum phenol sulfonate, and aluminum sulfonate, an amount effective to enhance the antiperspirant properties of said metallic salt up to about 50% by weight of dimethyl sulfoxide and a cosmetically acceptable carrier.

References Cited

UNITED STATES PATENTS

| | | | |
|---|---|---|---|
| 2,365,898 | 12/1944 | Morris et al. | 196—13 |
| 2,658,038 | 11/1953 | Proell | 252—161 |
| 2,787,595 | 4/1957 | Webb | 252—138 |
| 2,836,512 | 5/1958 | Sample | 117—65 |
| 2,230,083 | 1/1941 | Montenier. | |

(Other references on following page)

UNITED STATES PATENTS

| | | |
|---|---|---|
| 2,236,387 | 3/1941 | Wallace et al. |
| 2,586,288 | 2/1952 | Apperson et al. |
| 2,990,333 | 6/1961 | Graham _____ 167—83 |

OTHER REFERENCES

Brown, V. K., et al., "A Note on the Toxicity and Solvent Properties of Dimethyl Sulfoxide," J. Pharm. Pharmacol. 15(10): 688–692 (October 1963).

Chem. Abstracts 55: 27644e–f (1961).

Selbin et al., "Metallic Complexes of Dimethyl Sulfoxide," J. Inorg. and Nuclear Chemistry 16: 219–224 (1961).

Chem. Abstracts 55:13640i–13641a (1961).

Chem. Abstracts 57: 3991F (1962).

Ferm, Lancet I, 1966: 208–209, Jan. 22, 1966.

Rubin et al., Science 153: 83–84, July 1, 1966.

Federal Register, 31 (248): 16403–16404, Dec. 23, 1966.

S. R. ROSE, Primary Examiner

U.S. Cl. X.R.

424—65, 66, 67, 337